Figure 1:
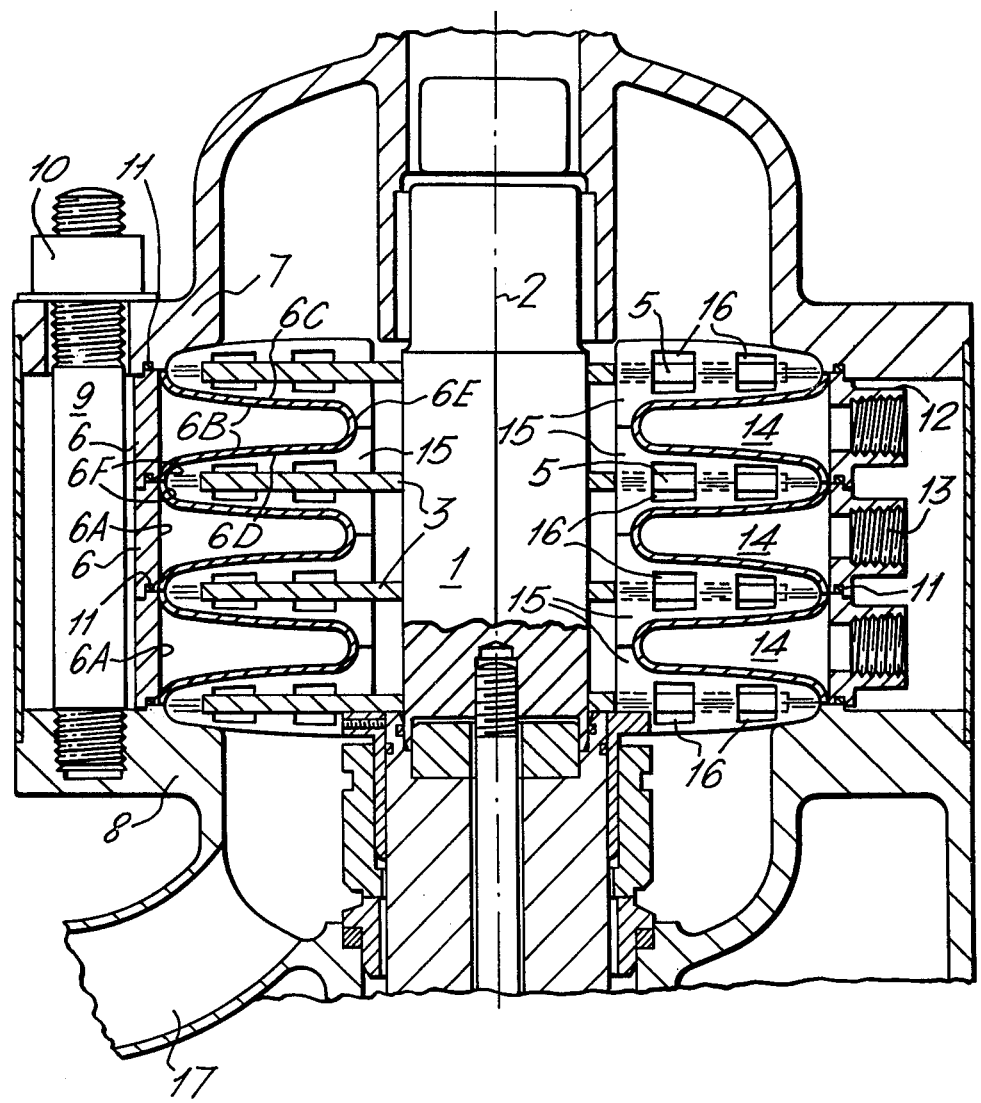

United States Patent [19]

Duckworth

[11] 4,279,295
[45] Jul. 21, 1981

[54] SCRAPED-SURFACE HEAT EXCHANGER

[75] Inventor: Edward D. Duckworth, Wokingham, England

[73] Assignee: A. Johnson and Company (London) Limited, London, England

[21] Appl. No.: 163,292

[22] Filed: Jun. 26, 1980

Related U.S. Application Data

[63] Continuation of Ser. No. 860,432, Dec. 14, 1977, abandoned.

[30] Foreign Application Priority Data

Dec. 16, 1976 [GB] United Kingdom ............... 52663/76
Feb. 23, 1977 [GB] United Kingdom ................. 7716/77

[51] Int. Cl.³ .............................................. F28F 5/00
[52] U.S. Cl. ...................................... 165/94; 366/312
[58] Field of Search ...................... 62/354; 165/91, 94, 165/109 R, 109 T, 120; 99/485; 366/309, 312, 313

[56] References Cited

U.S. PATENT DOCUMENTS

| | | | |
|---|---|---|---|
| 1,132,422 | 3/1915 | Anderson | 165/94 |
| 1,375,210 | 4/1921 | Clayton et al. | 165/94 |
| 2,677,942 | 5/1954 | Schott et al. | 62/354 |
| 4,105,066 | 8/1978 | Bühler | 165/94 |

FOREIGN PATENT DOCUMENTS

| | | | |
|---|---|---|---|
| 452684 | 8/1936 | United Kingdom | 165/94 |
| 509536 | 7/1939 | United Kingdom | 165/94 |
| 644312 | 10/1950 | United Kingdom | 165/94 |
| 656647 | 8/1951 | United Kingdom | 165/94 |
| 719660 | 12/1954 | United Kingdom | 165/94 |
| 739288 | 10/1955 | United Kingdom | 165/94 |
| 793457 | 4/1958 | United Kingdom | 366/312 |
| 1136423 | 12/1968 | United Kingdom | 165/94 |

*Primary Examiner*—Sheldon J. Richter
*Attorney, Agent, or Firm*—Finnegan, Henderson, Farabow, Garrett & Dunner

[57] ABSTRACT

A scraped-surface heat exchanger comprises a stator surrounding a rotor, the stator having annular projections extending inwardly towards the axis of rotation of the rotor. Scrapers on the rotor scrape both blanks of each projection as the rotor rotates. The two blanks of each projection could be planar, the planes being substantially perpendicular to the axis of rotation of the rotor. Instead, at least one of the flanks could be sloping with respect to the axis of rotation.

26 Claims, 7 Drawing Figures

SCRAPED-SURFACE HEAT EXCHANGER

CROSS-REFERENCE TO RELATED APPLICATION

This is a continuation of Ser. No. 860,432, filed Dec. 14, 1977, now abandoned.

According to the invention, there is provided a scraped-surface heat exchanger for treating a fluid material comprising a stator surrounding a rotor, the stator comprising a plurality of annular projections extending inwardly towards the axis of rotation of the rotor and dividing the space within the stator into a plurality of annular spaces which communicate with one another at locations radially inwardly of the tips of the projections, the rotor carrying scraping means comprising, in each annular space between two adjacent projections, at least one scraper blade which scrapes the whole of one flank of one projection and the whole of the opposite flank of the other projection, whereby some of the material is scraped off the projections as the rotor rotates and is mixed with the remainder of the material. According to the invention, there is also provided a scraped-surface heat exchanger comprising a stator surrounding a rotor, the stator having a plurality of annular projections extending inwardly towards the axis of rotation of the rotor, each projection having a first flank which is the upper flank when the heat exchanger is appropriately positioned, with the axis of rotation of the rotor vertical, and which then slopes downwardly, proceeding towards said axis, the rotor carrying scrapers which scrape the first flanks and the opposite flanks of the projections as the rotor rotates. Preferably, in this case too, the annular spaces, into which the space within the stator is divided by the projections, communicate with one another at locations radially inwardly of the tips of the projections and preferably the whole of each flank is scraped.

According to the invention, there is furthermore provided a scraped-surface heat exchanger for treating a fluid material comprising a stator surrounding a rotor, the stator comprising a plurality of annular projections extending inwardly towards the axis of rotation of the rotor and the rotor carrying scraper means comprising, in each annular space between two adjacent projections, scraping means which scrape the whole of one flank of one projection, the whole of the opposite flank of the other projection, the part of the stator between the roots of the projections and half of the tip of each of the projections whereby some of the material is scraped off the projections as the rotor rotates and is mixed with the remainder of the material. Again, preferably, the annular spaces, into which the space within the stator is divided by the projections, communicate with one another at locations radially inwardly of the tips of the projections.

The scrapers may press against the flanks as a result of the scrapers possessing resilience and/or as a result of the pressure of the fluid material and/or by springs. They could be pivotally mounted on vanes projecting from the rotor.

The heat exchange could be effected with gas or liquid heat exchange medium flowing through the stator, for example along it in the same direction as, or in counter-current with, a fluid material to be heated or cooled which flows along the rotor between the rotor and the stator.

The projections preferably taper, proceeding towards the axis of rotation of the rotor and they are preferably hollow, the spaces within them being for one of the two-fluids involved in the heat exchange. Thus the projections could be of sheet material. The spaces within them could communicate with one another at their extremities remote from the rotor, so that the above-mentioned gas or liquid can flow into and out of them, from one to another along the stator. Preferably, the connections between the spaces within adjacent projections are staggered circumferentially so that the gas or liquid entering the space within one projection has to flow part of the way around the axis of rotation of the rotor before it can leave that space and flow into the space within the next projection. The space within each projection could be divided into two or more parts, for example by virtue of each projection being made up of two or more segments distributed around the axis of rotation of the rotor. The two flanks of each projection or of each segment of each projection could also be provided by separate members.

The two flanks of each projection could be planar, the planes being substantially perpendicular to the axis of rotation of the rotor.

Alternatively, each projection could have a first flank which is the upper flank when the heat exchanger is positioned with the axis of rotation of the rotor vertical and which then slopes downwardly, proceeding towards said axis. The above-mentioned first flanks and the opposite flanks of the projections are referred to below as upper flanks and lower flanks, respectively, but that does not mean that the heat exchanger necessarily operates with the axis of rotation of the rotor vertical, or, if it is vertical, with the first flanks uppermost. The lower flanks of the projections preferably slope downwardly, proceeding away from said axis. The greater part of each upper flank and/or each lower flank could be planar. Alternatively, the greater part of each upper flank and/or each lower flank could be concavely or convexly rounded in order to give the projections greater strength if they are of sheet material. It is highly desirable so to construct the stator that when the heat exchanger is positioned with the upper flanks of the projections uppermost and the axis of the stator vertical, liquids of low viscosity in the space within the stator, for example low-viscosity liquids used in the heat exchanger or low-viscosity liquids for cleaning the heat exchanger after use, will drain completely from the stator and will not, for example, form pools on the upper flanks of the projections.

Whether the two flanks of each projection lie in planes which are substantially perpendicular to the axis of rotation of the rotor or at least the upper flanks are sloping as described above, the tips of the projections could be convexly rounded. There could be, alternatively or additionally, concave rounding between the roots of adjacent projections. Preferably the srapers or additional scrapers scrape also these convexly and/or concavely rounded parts. Preferably, each annular space between two adjacent projections receives at least one scraper blade which scrapes one flank of one projection and the opposite flank of the other projection and preferably also the part between the roots of the two projections and half of the tip of each of the two projections. The blades may be of plastics material and may be held in slots in plates, for example circular plates, mounted on the rotor and co-axial with it.

The stator may comprise a stack of annular parts each of which provides only one of the projections.

Figure 2:
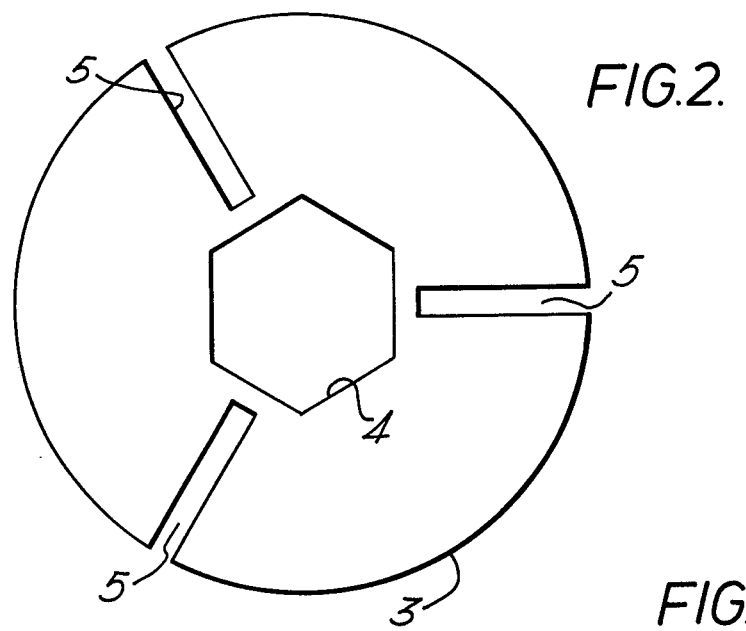
Figure 3:
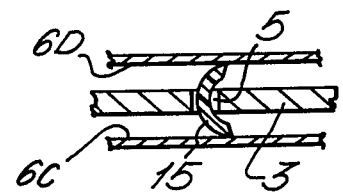
Figure 4:
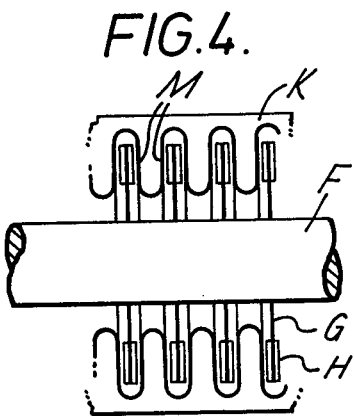
Figure 5:
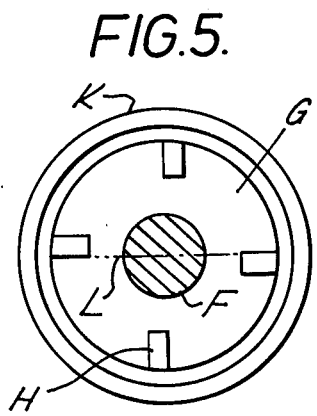
Figure 6:
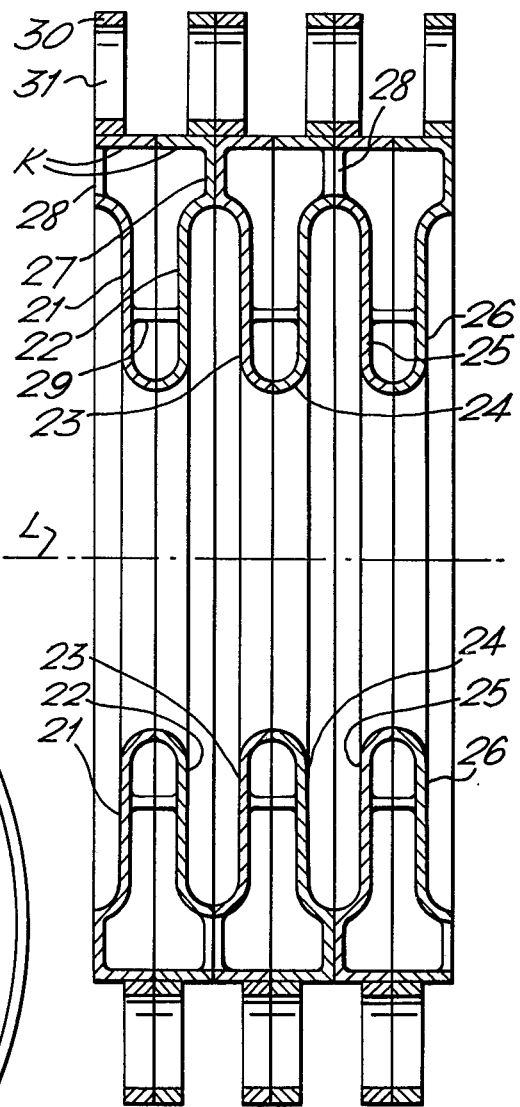
Figure 7:
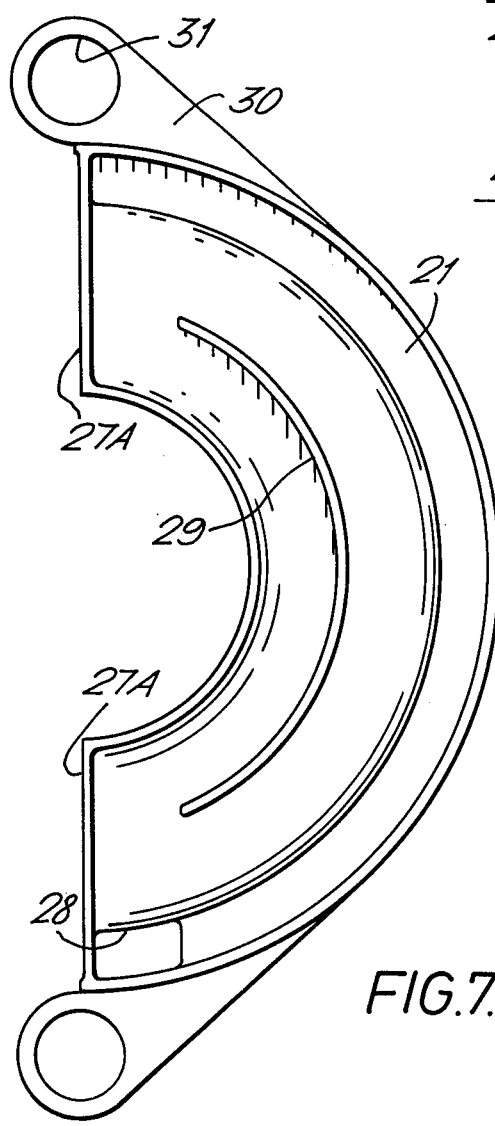

Two examples in accordance with the invention are described below with reference to the accompanying drawings, in which:

FIG. 1 shows a side view of a first rotary scraped-surface heat exchanger, in section, FIG. 2 shows a plan view of a disc on the rotor of the heat exchanger, FIG. 3 shows a scraper mounted on the disc, FIGS. 4 and 5 illustrate the principle of a second rotary scraped-surface heat exchanger by means of a diagrammatic side view and a diagrammatic end view, respectively, FIG. 6 shows a side view, in section, of the heat exchanger of FIGS. 4 and 5, and FIG. 7 shows an end view of a portion of the same heat exchanger.

The heat exchanger shown in FIGS. 1 to 3 operates with its rotor 1 rotating about a vertical axis 2. The rotor is preferably of stainless steel and is of regular hexagonal cross-section over the greater part of its length and along that part are regularly distributed circular discs 3, the faces of which are perpendicular to the axis 2. The discs have regular hexagonal holes 4 through them at their centres and they are formed with radial slots 5.

A stator surrounding the rotor comprises a stack of similar annular members 6 (there will usually be more than the three shown) held between flanges 7 and 8 of a housing by bolts 9 provided with nuts 10. Each annular member comprises a collar 6A and a sheet metal part 6B, preferably stainless steel, which affords an annular projection extending inwardly towards the axis 2. The upper flank 6C of each projection is slightly concave but over the whole of its length it slopes downwardly, proceeding towards the axis 2, so that pools of low-viscosity liquid cannot remain on the flanks 6C of the projections when it is desired to drain the heat exchanger with the axis of the stator, which is the axis 2, vertical. The lower flank 6D of each projection is also slightly concave and over the whole of its length slopes downwardly, proceeding away from the axis 2. The tip 6E of each projection is convexly rounded and there is a concave rounding at 6F between the roots of adjacent projections. Seals 11 between the collars 6A and between the end collars and the flanges 7 and 8 are compressed by the bolts 9 and nuts 10. The collars are formed with bosses 12 formed with screw-threaded holes 13 to receive connections for supplying heat-exchange fluid to and taking it from hollows 14 within the projections 6B.

Each slot 5 receives a plastics scraper blade 15 which, when free from stress, is flat and wider than the space between the lower flank 6D of one projection 6B and the upper flank 6C of the next. The scraper blades are forced into arcuate form as shown in FIG. 3 and sharp edges of them scrape, in each case, the whole of one flank 6D, one flank 6C and one concavely rounded part 6F and halves of each of two projection tips 6E. The blades have holes 16 through them.

Fluids which are to be in heat-exchange relationship are pumped along the heat exchanger, for example in counter-current, in one case through the hollows 14 in turn and in the other case in through or out of a connection 17 at the lower end of the housing, through the space between stator and rotor and out of or in through the upper end of the housing and being continually scraped off all points on the projections 6B.

The scraped-surface heat exchanger shown in FIGS. 4 and 5 comprises a rotor F carrying a row of radial discs G on each face of which are pivotally mounted four scraper blades H which are uniformly distributed around the axis of rotation L of the rotor but are not quite radial, as FIG. 5 shows.

A stator concentrically surrounds the rotor and consists of a hollow cylinder K and a row of projections extending inwardly towards the rotor and each having two planar surfaces perpendicular to the axis L on opposite flanks M of the projections. The scraper blades are pressed against these planar surfaces by springs (not shown). Fluid material to be cooled or heated is pumped through the space between the rotor and the stator, in at one end and out at the other end, and it is scraped off the planar surfaces by the scraper blades.

The projections are hollow and the spaces within them communicate with one another so that gaseous or liquid cooling or heating medium can flow from one to the other along the stator. The tips of the projections are domed or convexly rounded and the outer extremities of the cavities between adjacent projections are concavely rounded.

FIG. 6 shows six semi-circular members 21 to 26 (there could be more or less) which co-operate with six more and similar semi-circular members to afford three (there could be more or less) annular projections as described above and the hollow cylinder K. Each projection has one flank afforded partly by one and partly by another of these members and its other flank likewise afforded by two more of the members. The members also afford barriers 27 and 27A and ports 28 so that gas or liquid which enters the space within one projection through a port 28 has to flow almost halfway round the axis L before it can flow out of that space and into the space within the next projection in the row. Reinforcing ribs 29 space the flanks of the projections apart and the members 21, 22 etc. have lugs 30 with holes 31 through them.

In the examples illustrated in the drawings, films of the material being treated form on the projections on the stator and are soon scraped off. The assembly of the rotor 1 and the discs 3 has radial plate-like parts, afforded by the parts of the discs 3 which are radially outward of the rotor, and these radial plate-like parts are imperforate except for the slots 5 and therefore the scraped-off material has no separate outlet through the rotor (in contrast to the apparatus shown in British Pat. No. 452,684) and it is mixed with the remainder of the material and proceeds with it along the space between the stator and the rotor.

I claim:

1. A scraped-surface heat exchanger comprising a stator surrounding a rotor, the stator having a plurality of annular projections extending inwardly towards the axis of rotation of the rotor, each projection having a first flank which is the upper flank when the heat exchanger is appropriately positioned, with the axis of rotation of the rotor vertical, and which then slopes downwardly, proceeding towards said axis, the rotor carrying scrapers which scrape the first flanks and the opposite flanks of the projections as the rotor rotates.

2. A heat exchanger according to claim 1 in which said opposite flanks of the projections slope downwardly, proceeding away from said axis.

3. A heat exchanger according to claim 1 in which the greater part of each upper flank is concavely rounded.

4. A heat exchanger according to claim 1 in which the greater part of each said opposite flank is concavely rounded.

5. A heat exchanger according to claim 3 in which the two flanks of each projection are provided by separate members.

6. A heat exchanger according to claim 1 in which the tips of the projections are convexly rounded.

7. A heat exchanger according to claim 1 in which there is concave rounding between the roots of adjacent projections.

8. A heat exchanger according to claim 1 in which in each annular space between two adjacent projections there is at least one scraper blade which scrapes one flank of one projection and the opposite flank of the other projection.

9. A heat exchanger according to claim 8 in which each scraper blade also scrapes the part of the stator between the roots of two adjacent projections and half of the tip of each of them.

10. A heat exchanger according to claim 1 in which the blades are held in slots in plates mounted on the rotor.

11. A heat exchanger according to claim 1 in which the stator comprises a stack of annular parts each of which provides only one of the projections.

12. A heat exchanger according to claim 1 in which the projections taper, proceeding towards the axis of the rotor.

13. A heat exchanger according to claim 1 in which the projections are hollow, the spaces within them being for one of the two fluids involved in the heat exchange.

14. A heat exchanger according to claim 13 in which the projections are of sheet material.

15. A heat exchanger according to claim 13 in which the spaces within the projections communicate with one another at their extremities remote from the rotor, so that said one of the fluids can flow into and out of them, from one to another along the stator.

16. A heat exchanger according to claim 15 in which the connections between the spaces within the adjacent projections are staggered circumferentially so that said one of the fluids entering the space within one projection has to flow part of the way around the axis of rotation of the rotor before it can leave that space and flow into the space within the next projection.

17. A heat exchanger according to claim 16 in which the space within each projection is divided into a plurality of parts.

18. A heat exchanger according to claim 17 in which the division is effected by each projection being made up of two or more segments distributed around the axis of rotation of the rotor.

19. A heat exchanger according to claim 18 in which the two flanks of each segment of each projection are provided by separate members.

20. A scraped-surface heat exchanger for treating a fluid material comprising a stator surrounding a rotor, said heat exchanger including means for rotating said rotor, the stator comprising a plurality of annular projections extending inwardly towards the axis of rotation of the rotor and dividing the space within the stator into a plurality of annular spaces which communicate with one another at locations radially inwardly of the tips of the projections, said projections having convexly rounded tips, the rotor carrying scraping means comprising, in each annular space between two adjacent projections, at least one scraper blade which scrapes the whole of one flank of one projection and the whole of the opposite flank of the other projection, whereby some of the material is scraped off the projections as the rotor rotates and is mixed in said annular spaces with the remainder of the material.

21. A scraped-surface heat exchanger for treating a fluid material comprising a stator surrounding a rotor, said heat exchanger including means for rotating said rotor, the stator comprising a plurality of annular projections extending inwardly towards the axis of rotation of the rotor and dividing the space within the stator into a plurality of annular spaces which communicate with one another at locations radially inwardly of the tips of the projections, the stator having concave rounding between the roots of adjacent projections, the rotor carrying scraping means comprising, in each annular space between two adjacent projections, at least one scraper blade which scrapes the whole of one flank of one projection and the whole of the opposite flank of the other projection, whereby some of the material is scraped off the projections as the rotor rotates and is mixed in said annular spaces with the remainder of the material.

22. A scraped-surface heat exchanger for treating a fluid material comprising a stator surrounding a rotor, said heat exchanger including means for rotating said rotor, the stator comprising a plurality of annular projections extending inwardly towards the axis of rotation of the rotor and dividing the space within the stator into a plurality of annular spaces which communicate with one another at locations radially inwardly of the tips of the projections, the rotor carrying scraping means comprising, in each annular space between two adjacent projections, at least one scraper blade which scrapes the whole of one flank of one projection, the whole of the opposite flank of the other projection, the part of the stator between the roots of the two adjacent projections and half of the tip of each of them, whereby some of the material is scraped off the projections as the rotor rotates and is mixed in said annular spaces with the remainder of the material.

23. A scraped-surface heat exchanger for treating a fluid material comprising a stator surrounding a rotor, said heat exchanger including means for rotating said rotor, the stator comprising a plurality of annular projections extending inwardly towards the axis of rotation of the rotor and dividing the space within the stator into a plurality of annular spaces which communicate with each other, the rotor carrying scraper means comprising, in each annular space between two adjacent projections, scraping means which scrape the whole of one flank of one projection, the whole of the opposite flank of the other projection, the part of the stator between the roots of the projections and half of the tip of each of the projections whereby some of the material is scraped off the projections as the rotor rotates and is mixed with the remainder of the material.

24. A heat exchanger according to claim 23 in which each said scraping means comprises at least one scraper blade which scrapes the whole of the two flanks, said part of the stator and half of the tip of each of said two projections.

25. A scraped-surface heat exchanger for treating a fluid material comprising a stator surrounding a rotor, said heat exchanger including means for rotating said rotor, the stator comprising a plurality of annular projections extending inwardly towards the axis of rotation of the rotor and dividing the space within the stator into a plurality of annular spaces which communicate with one another at locations radially inwardly of the tips of the projections, radial plate-like parts on the rotor, portions of the radial plate-like parts defining slots therein, the radial plate-like parts being imperforate except for said slots, and scraping means mounted in said slots and comprising, in each annular space between two adjacent projections, at least one scraper blade which has a width when free from stress which is greater than the spacing between the flanks which it scrapes and is flexed so that is cross-section is arcuate and it scrapes the whole of one flank of one projection and the whole of the opposite flank of the other projections, whereby some of the material is scraped off the projections as the rotor rotates and is mixed in said annular spaces with the remainder of the material.

26. A scraped-surface heat exchanger for treating a fluid material comprising a stator surrounding a rotor, said heat exchanger including means for rotating said rotor, the stator comprising a plurality of annular projections extending inwardly towards the axis of rotation of the rotor and dividing the space within the stator into a plurality of annular spaces which communicate with each other, radial plate-like parts on the rotor, portions of the radial plate-like parts defining slots therein, the radial plate-like parts being imperforate except for said slots, and scraper means mounted in said slots and comprising, in each annular space between two adjacent projections, scraping means which scrape the whole of one flank of one projection, the whole of the opposite flank of the other projection, the part of the stator between the roots of the projections and half of the tip of each of the projections whereby some of the material is scraped off the projections as the rotor rotates and is mixed in said annular spaces with the remainder of the material, said scraping means comprising at least one scraper blade which scrapes the whole of the two flanks, said part of the stator and half of the tip of each of said two projections, said scraper blade having a width when free from stress which is greater than the spacing between the two flanks and being flexed so that its cross-section is arcuate.

* * * * *